United States Patent Office 3,531,274
Patented Sept. 29, 1970

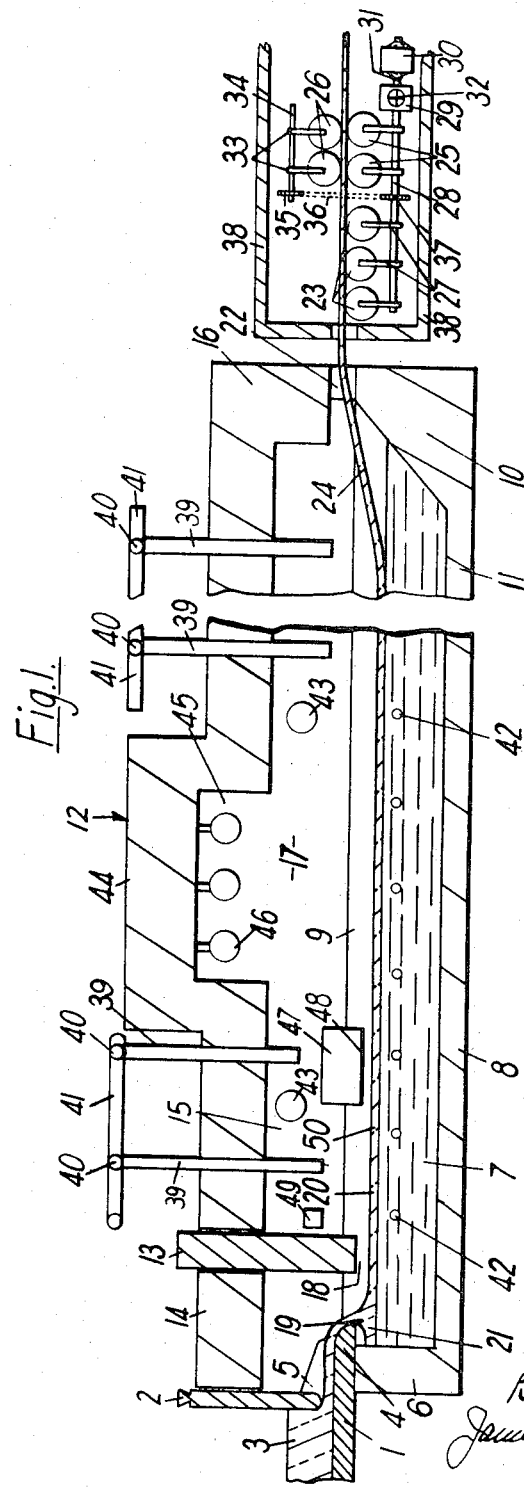

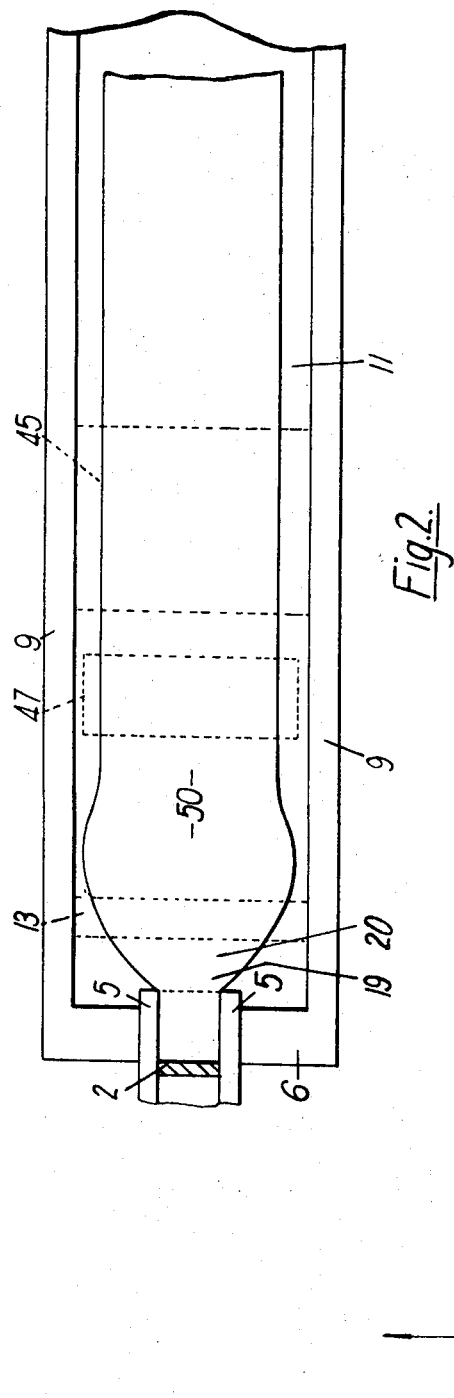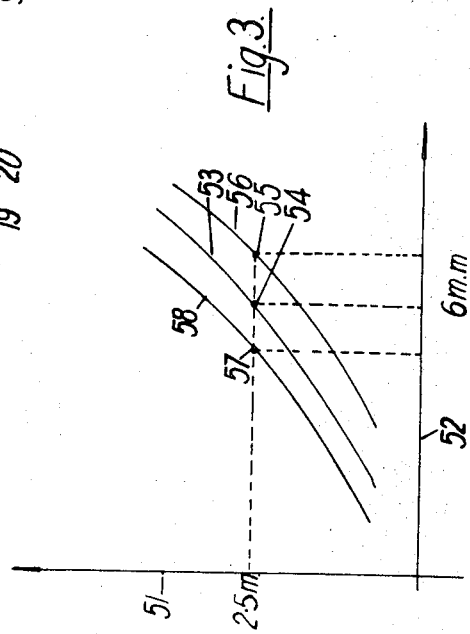

3,531,274
METHOD FOR THE MANUFACTURE OF FLOAT GLASS
George Alfred Dickinson, Brian W. Oxley, and James E. C. Thomas, St. Helens, England, assignors to Pilkington Brothers Limited, Liverpool, England, a corporation of Great Britain
Continuation of application Ser. No. 675,745, Sept. 29, 1967, which is a continuation-in-part of application Ser. No. 324,678, Nov. 19, 1963. This application Jan. 21, 1969, Ser. No. 792,262
Int. Cl. C03b 18/02
U.S. Cl. 65—99                                4 Claims

ABSTRACT OF THE DISCLOSURE

Float glass of simultaneously reduced width and thickness is manufactured on a bath of molten metal by interrelated control of the longitudinal viscosity gradient subsisting in the ribbon of glass advancing along the glass and of the tractive effort applied to the ribbon.

CROSS REFERENCES TO RELATED APPLICATIONS

This application is a continuation of our copending application Ser. No. 675,745, filed Sept. 29, 1967, and now abandoned which was in turn a continuation-in-part of our application copending therewith Ser. No. 324,678, filed Nov. 19, 1963 and abandoned after the filing of said application Ser. No. 675,745.

BACKGROUND OF THE INVENTION

Field of the invention

This invention relates to the manufacture of flat glass in ribbon form on a bath of molten metal.

In the manufacture of flat glass in ribbon form on a bath of molten metal, which bath is so constituted as to have all the characteristics fully described in U.S. Pat. No. 2,911,759, glass is delivered to the bath at a controlled rate and the ribbon of glass produced is discharged from the bath to an annealing lehr.

A main object of the present invention is to provide an improved method of manufacturing flat glass in ribbon form on a bath of molten metal in which glass of various commercial widths and thicknesses can be produced to suit varying commercial demands.

SUMMARY

A method of manufacturing flat glass in ribbon form from a layer of molten glass established on a bath of molten metal according to the invention, comprises the steps of maintaining the glass in a molten state as it is advanced along the bath, subjecting the glass to interrelated adjustable tractive effort in the direction of advance along the bath and adjustable thermal control of the longitudinal change of viscosity in the advancing ribbon so as to arrest dimensional change when the ribbon has been caused to assume a desired width and thickness.

By inter-relating the thermal control of the longitudinal change of viscosity in the advancing ribbon of glass and the controlled tractive effort a ribbon of desired dimensions of width and thickness is obtained; for example by adjusting the longitudinal viscosity gradient distribution in dependance on adjustments made to the tractive effort, or by adjusting the tractive effort in dependance on adjustments made to the viscosity distribution, in order to achieve the operating conditions necessary for producing the ribbon of glass of desired dimensions. Flotation of the molten glass on the molten metal causes the action of the forces of surface tension and gravity to be a flattening action. The surface flatness produced when the glass is in a molten state on the bath is preserved in the stiffened ribbon taken up from the bath surface.

The ultimate width and thickness of the ribbon are dependent on the characteristics of the layer of molten glass established on the bath, and additional regulation of the mobility of the glass as the layer is established provides an additional control of the ultimate width and thickness of the ribbon of glass produced.

The present invention also comprehends apparatus for manufacturing flat glass in ribbon form having a desired width and thickness, comprising a tank containing a bath of molten metal and having an inlet to and an outlet from the bath, means for delivering glass at a controlled rate through the inlet to the bath establishing a layer of molten glass on the bath and advancing the layer along the bath, localised adjustable coolers and heaters spaced apart down the bath and adjustable independently or together to control the longitudinal change of viscosity in the advancing glass, and regulatable means at the outlet from the bath for discharging the ribbon of glass from the bath at a controlled rate thereby controlling the tractive effort transmitted through the glass, the local coolers and heaters being adjustable in relation to the tractive effort so that when the viscosity of the ribbon is such as to arrest further dimensional change the ribbon has the required width and thickness.

BRIEF DESCRIPTION OF THE DRAWINGS

FIG. 1 is a sectional elevation of apparatus for manufacturing flat glass in ribbon form according to the invention, which is illustrated by way of example, the apparatus including a tank structure holding a bath of molten metal and means for delivering molten glass at a controlled rate to the bath and for discharging the glass from the bath in desired ribbon form, FIG. 2 is a plan view of the inlet end of the tank structure holding the bath of molten metal of FIG. 1, and FIG. 3 is a graph showing the inter-relation between the width and thickness of a ribbon of glass manufactured by a method of manufacture according to the invention.

In the drawings like reference numerals designate the same parts.

DESCRIPTION OF THE PREFERRED EMBODIMENT

Referring to the apparatus shown in FIGS. 1 and 2, a forehearth of a continuous glass melting tank is indicated at 1 and a regulating tweel at 2. Molten glass 3 flows from the melting tank over the forehearth 1 to a spout which comprises a lip 4 and side jambs 5, one of which is indicated in FIG. 1. The lip 4 and side jambs 5 form a spout of generally rectangular cross-section.

The spout lip 4 overlaps an end wall 6 of a tank structure containing a bath 7 of molten metal having the characteristics of the molten metal bath described in U.S. Pat. No. 2,911,759, and which is preferably a bath of molten tin or an alloy of tin in which tin predominates. The tank structure further comprises a floor 8, side walls 9 and an end wall 10 at the outlet end of the bath. The floor 8, side walls 9 and end walls 6 and 10 form an integral structure. The level of the surface of the bath of molten tin 7 is indicated at 11 and the configuration of the tank, as illustrated in FIG. 2, is such that the distance between the side walls 9, 9 is wider than the width of the glass on the bath.

The tank structure supports a roof structure including a roof 12, a vertically adjustable end wall 13 at the inlet end of the bath, a roof section 14 over the spout 4, 5, side walls 15, and an end wall 16 at the outlet end of the bath. The roof structure thus provides a tunnel over the bath 7 and defines a headspace 17 over the bath.

The adjustable end wall 13 at the inlet end of the bath is set to define a narrow inlet 18 for molten glass 19 flowing from the spout lip 4 on to the bath to establish a layer of molten glass on the bath as indicated at 20.

The vertical spacing of the lip 4 of the spout from the surface 11 of the bath is of the order of a few inches and is such as to ensure that a heel 21 of molten glass is formed behind the glass flowing down the spout to the bath, which heel extends rearwardly under the spout lip 4 to the end wall 6.

The outlet end walls 10 and 16 of the tank structure and roof structure together define a narrow outlet 22 from the bath, and outside the discharge end of the tank driven conveying rollers 23 are so mounted as to be exposed above the level of the bottom of the outlet 22. The stiffened ribbon of glass 24 which is taken up from the bath surface and discharged through the outlet 22 from the bath is first supported on the driven conveying rollers 23 and then is gripped between pairs of driver rollers 23, 26.

The lower rollers 23 and 25 are each connected by a worm driven 27 to a master shaft 28 which is driven by a positive infinitely variable gear 29. An electric motor 30 drives the input shaft 31 of the gear 29, and the speed of the master shaft 28 is adjusted by regulating the gear 29 by means of a hand wheel 32.

The superimposed rollers 26 of the pairs 25, 26 are each connected by a worm drive 33 to an upper shaft 34 on which is mounted a sprocket 35 connected by a driving chain 36 to a sprocket 37 fixed on the master shaft 28, so that the co-operating rollers 25 and 26 are always maintained at the same controlled speed to supply a controlled tractive effort to the ribbon of glass 24 moving towards the outlet, which tractive effort determines the speed of advance of the glass along the bath. The rollers 23, 25 and 26 are enclosed in the inlet end of a conventional tunnel lehr 38. Adjustment of the speed of the rollers 23, 25 and 26 by operation of the hand wheel 32 controls the speed of the stiffened ribbon of glass 24 along the bath and consequently controls the speed of advance of the molten glass along the bath before it has attained a viscosity such as to arrest further dimensional change in the ribbon of glass; that is, control is provided of the tractive effort transmitted through the glass advancing along the bath.

The stiffened ribbon 24 discharged from the bath has a lustre equivalent to that known as "fire finish," is of uniform thickness, has flat surfaces and is free from distortions. The ribbon 24 passes through the lehr 38 and is annealed before emerging from the lehr for cutting into large sheets as is well understood in the art. Sheets of commercial sizes are then cut from the large sheets.

The roof structure 12 is at intervals provided with ducting 39 connected by branches 40 to headers 41 through which a protecting gas is fed into the headspace 17 of the structure to create a plenum in the substantially closed headspace. The protecting gas is a gas which will not react chemically with the metal of the bath to produce contaminants for the glass, thereby protecting the bath surface at the sides of the ribbon and under the end of the stiffened ribbon 24 leaving the bath, and preventing the formation of contaminants for the glass. Ingress of external atmosphere through the restricted inlet and outlet is also prevented.

The temperature of the bath in the tank structure is regulated by thermal regulators 42 immersed in the bath. The headspace 17 over the bath is heated by radiant heat directed downwardly from the roof and to this end heaters 43 are mounted under the roof structure.

In order to provide selective regulation of the longitudinal change of viscosity in the advancing ribbon of glass the roof structure has a recessed formation as indicated at 44 and in the recess 45 in the headspace so formed are mounted additional radiant heaters 46. Thus a zone is constituted in the headspace through which the ribbon passes. A cooler 47 indicated diagrammatically as a water-cooled box is mounted in the tank structure near to the upper surface of the ribbon. The cooler presents a flat heat-absorbing bottom surface 48 to the ribbon of glass as it is advanced along the bath.

The radiant heaters 46 and the cooler 47 are adjustable either separately or together to provide thermal control of the longitudinal change of viscosity down the advancing ribbon of glass. Although the heaters and coolers are spaced down the bath from the inlet end of the bath, the effect of the heaters and cooler is felt up to the inlet end, and the heaters and cooler 11 are adjustable separately or together to control the longitudinal change of temperature down the bath to which the advancing glass is subjected as it advances along the bath, thereby controlling the longitudinal viscosity gradient in the advancing ribbon of glass. If the longitudinal viscosity gradient is to be decreased then the radiant heat from the heaters 46 is increased and similarly, if the viscosity gradient is to be increased the cooler 47 is brought into the action. In some circumstances fine control of the viscosity gradient is obtained by simultaneous adjustment of the heaters 46 and the cooler 47.

In the embodiment illustrated in FIGS. 1 and 2 molten glass 19 falls over the spout lip 4 at a rate controlled by the vertical position of the regulating tweel 2. The mobility of the glass 19 in the layer 20, is regulated for example by radiant heaters shown diagrammatically as a heater 49 mounted in the headspace 17 near the inlet end wall 13. Alternatively the side jambs 5 of the spout may be heated.

The molten glass 19 flows forwardly as it reaches the bath and the layer 20 of molten glass established on the bath is advanced along the bath under thermal conditions which ensure that the molten glass flows laterally unhindered to the limit of its free flow to establish on the bath a buoyant body 50 of molten glass, which body is then advanced in ribbon form along the bath.

The stiffened ribbon 24 produced is sufficiently stiff to hold its dimensions and to be taken unharmed from the bath by the mechanical conveying rollers 23, 25 and 26 which apply tractive effort to the ribbon 24.

In order that the ribbon 24 shall have a required width and thickness there is inter-related control of the longitudinal change of viscosity in the advancing ribbon of glass and of the tractive effort transmitted to the advancing glass 50 by the stiffened ribbon 24. The width and thickness of the ribbon are thus continuously and simultaneously reduced by the controlled forces to which it is subjected, and the ribbon is caused to have assumed the desired width and thickness by the time that the viscosity of the ribbon is such as to arrest further dimensional change in the ribbon. As the glass is advancing it is subjected to a controlled tractive effort in the direction of advance from the forces of surface tension and gravity. The effect of the forces of surface tension and gravity is itself dependent on the viscosity of the glass.

The thermal control of the longitudinal change of viscosity in the advancing ribbon of glass by the heaters 46 and/or the cooler 47 is effected within the viscosity range of $10^3$ to $10^7$ poises of the glass. At the upper limit of about $10^7$ poises the glass has a viscosity such that further dimensional change is arrested. The actual viscosity of the glass at which any further significant dimensional change is arrested is dependent on the tractive effort transmitted to the advancing glass by the stiffened ribbon 24. Adjustment of the heaters 46 and cooler 47 controls the longitudinal change of viscosity in the advancing glass in relation to the tractive effort to determine the distance down the bath at which this upper viscosity limit is achieved in the glass.

To give a greater degree of accuracy of control of the ultimate width and thickness of the ribbon 24, a further fine regulation of the rate of change of viscosity within the viscosity range $10^3$ to $10^7$ poises enforces a dimensional trimming by effecting corresponding small dimensional changes in the ribbon.

The requirements of industry are for flat glass of various thicknesses to suit various applications and uses of the flat glass and to suit different manufacturing tolerances, for example in the motor car trade, and it is therefore highly desirable to provide a convenient way of manufacturing flat glass on a bath of molten metal having various widths and thicknesses while maintaining the throughput of glass through the plant.

The present invention enables glass to be produced by the float process in different widths and thicknesses but without altering the rate of production of molten glass in the glass melting tank or the rate of delivery of molten glass onto the bath of molten metal which rate is regulated by the positioning of the tweel 2 relative to the floor 1 of the spout. Dimensional changes which occur in the advancing glass as it thins under the action of the tractive effort applied to the glass from the rolls outside the outlet end of the tank structure at the same time as there is a concomitant flattening action from the forces of surface tension and gravity, involves a change in width which is related to the change in thickness.

The interdependence of width and thickness in the ribbon of glass is dependent both on the applied tractive effort and on the longitudinal viscosity gradient existing in the glass during the time when the glass is being thinned.

The nature of the longitudinal viscosity gradient effects the transmission of tractive effort through the glass which is being thinned and FIG. 3 is a graph showing the definite form of the interdependence which has been found to exist. FIG. 3 is a plot of the width of the ribbon as the ordinate 51 and the thickness of the ribbon as the abscissa 52. A family of curves is shown, and each of these curves 53, 56 and 58 corresponds to a different longitudinal viscosity gradient in the advancing glass. The curve 56 corresponds to a gradient of higher slope and the curves 53 and 58 correspond to longitudinal viscosity gradients of progressively decreasing slope.

The variable along any one of the curves 53, 56 and 58 is the tractive effort applied to the ribbon which is best considered as the speed of the ribbon of glass 24 as it is taken up off the bath surface and advanced by the rolls 23, 25 and 26 which apply the tractive effort to the glass.

On any one of the curves representing a particular longitudinal viscosity gradient the width and thickness of the glass produced is represented by points on the curve and can be altered according to the relationship represented by the curve, by varying the tractive effort. On each curve as the tractive effort is increased so both the width and the thickness decrease according to the interrelation represented by the curve. The point 54 on the curve 53 for example, is the working point on the curve indicating the tractive effort necessary, when the longitudinal viscosity gradient is that represented by the curve 53, to produce a ribbon of glass 2.5 meters wide and 6 mm. thick from a ribbon of glass which has been developed on the bath of molten metal by permitting unhindered lateral flow of molten glass on the bath to the limit of its free flow.

In this example of operation according to the invention both the applied tractive effort and the longitudinal viscosity gradient are adjusted and selectively set so that the process operates according to the conditions represented by the point 54 on curve 53. Molten glass 19 is poured onto the bath of molten metal from the spout 4 at the rate of 30 kg. of molten glass per minute to form an initial layer of molten glass on the bath which is 1.5 mm. wide and 18 mm. thick and is advancing along the bath at the rate of 3 m. per minute. The glass delivered to the bath is initially at a temperature of about 1,070° C. at which temperature its viscosity is about $10^4$ poises.

The molten glass delivered to the bath flows laterally unhindered to the limit of its free flow to establish the buoyant body 50 of molten glass which is at a temperature of about 1,025° C. This buoyant body is 3.3 m. wide and 7 mm. thick. The rate of advance of the glass along the bath at this stage is substantially unchanged at about 3 m. per minute but the glass begins to be influenced by the longitudinal viscosity gradient and a steady decrease in the temperature of the glass and a corresponding rise in its viscosity is evident.

As the advancing body 20 of molten glass is further advanced in ribbon form along the bath it is subjected to a controlled temperature gradient which induces in the glass a longitudinal viscosity gradient which is related to the tractive effort applied to the ultimate ribbon of glass. This tractive effort which is represented by the point 54 on curve 53 is applied to the glass by the removal of the ultimate glass ribbon from the bath at a steady rate of 4.5 m. per minute.

The initial temperature gradient to which the advancing glass is subjected is not strictly linear being adjustable by fine control of the cooler 47 and the heaters 46 but when averaged there is an initial temperature gradient established along the first 10 meters of advance of the bath of about 20° C. per meter which corresponds to a longitudinal viscosity gradient of 6.3 poises per meter represented by the curve 53.

Towards the end of this first 10 meters of advance of the glass in ribbon form the temperature gradient is increasing above the figure of 20° C. per meter and during the next five meters of advance of the glass the temperature gradient has a slightly increased average slope being about 22° C. per meter.

In this example therefore the viscosity of the glass increases from $10^4$ poises to about $10^6$ poises during its first 15 meters of advance along the molten metal of the bath this giving the average longitudinal viscosity gradient mentioned above of 6.3 poises per meter.

By the time the glass has advanced through this first 15 meters of its travel its temperature has reached about 825° C. at which temperature the tractive effort, indicated by the rate of discharge of 4.5 meters per minute of the ultimate ribbon 24, ceases to have further influence on the dimensions of the glass ribbon. The viscosity of the glass is then about $10^6$ poises and having reached a temperature of about 825° C. is effectively stabilized at the dimensions of 2.5 meters by 6 mm. which the glass has then achieved.

Thereafter the stabilized ribbon 24 is gradually cooled as it is further advanced and is taken up from the bath surface for delivery through the outlet 22 from the bath at a temperature of about 650° and at the above-mentioned rate of about 4.5 meters per minute.

A controlled change in the width and thickness of the ribbon of glass produced cannot be effected by altering the viscosity gradient alone or by altering the tractive effort only. Inter-related selective control of both the longitudinal viscosity gradient by regulation of the heaters 46 and of the cooler 46 and of the tractive effort by adjustment of the speed of the rollers 23, 25 and 26 must be effected in order to produce a different width and thickness.

Referring to FIG. 3, if it is desired to produce a ribbon of glass which is 2.5 meters wide but which is slightly thicker than 6 mm., the longitudinal viscosity gradient is altered by regulating the heaters 46 and cooler 47 to increase the longitudinal viscosity gradient in the advancing ribbon of glass to about 6.5 poises per meter as represented by the curve 56.

Usually this is effected by adjustment of the operation of the cooler 47 so that more heat is extracted from the advancing glass but fine control is achieved by some complementary adjustment of the heaters 46 as well. By interrelated reduction of the tractive ecort the width of the ribbon is maintained at 2.5 meters. The applied tractive effort is reduced by reducing the ribbon speed at the outlet from the bath to about 4 meters per minute.

These conditions are represented by the point 55 on curve 56 which represents the operating conditions which result in the production of a ribbon of glass 2.5 meters wide and 6.5 mm. thick.

The inter-relation between the control of viscosity gradient and tractive effort is further illustrated with reference to the production of a ribbon of glass which is 2.5 meters wide and 5.5 mm. thick. In order to maintain the width of the ribbon at 2.5 meters the longitudinal viscosity gradient is decreased by increasing the effect of the heaters 46 and decreasing the effectiveness of the cooler 47. This achieves a viscosity gradient in the advancing glass of the order of 6 poises per meter represented by the curve 58 in FIG. 3.

The necessary conditions to produce a ribbon 2.5 meters wide and 5.5 mm. thick are determined by the point 57 on the curve 58. This involves an increase in the applied tractive effort corresponding to discharging the ribbon at the rate of 5 meters per minute, fine regulation of both the viscosity gradient and the tractive effort to enforce a dimensional trimming to cause the ribbon to assume more closely the desired width of 2.5 meters and thickness of 5.5 mm. by the time the glass is sufficiently stiffened to resist further dimensional change.

Although only three curves are shown in FIG. 3 for the sake of clarity, it will be appreciated that whenever there is any adjustment in the temperature conditions along the bath either by regulation of the heaters 46, or the cooler 47, or both at the same time, then the longitudinal viscosity gradient in the glass is altered and the operating conditions are represented on a different curve corresponding to the longitudinal viscosity gradient then subsisting. The explanatory curves of FIG. 3 represent average longitudinal viscosity gradients, but it will be appreciated that under practical operating conditions the viscosity gradient is not necessarily linear, as has already been indicated, and sensitive fine control of the width and thickness of the glass within each of the viscosity gradients represented diagrammatically in FIG. 3 is achieved by fine regulation of the tractive effort at the same time as the viscosity gradient is regulated in order to achieve the desired dimensional trimming of the ultimate ribbon of glass.

Thus by inter-related regulation of the longitudinal change of viscosity of the glass within the range of $10^3$ to $10^7$ poises, and of the applied tractive effort, commercial float glass of required graded widths and thicknesses is produced without any alteration of the output from the glass melting furnace being necessary. Although the ribbon of glass 24 is, as described above, usually discharged from the tank structure to an annealing lehr the bath may be extended at its outlet end and its temperature so controlled that the ribbon 24 is at least partially annealed before it is discharged from the bath.

Additional control of width and thickness may be achieved by controlling the viscosity of the molten glass arriving on the bath to establish the layer 20 of molten glass on the bath. A family of curves similar to those of FIG. 3 can be derived, each such curve representing the delivery of glass to the bath at a different viscosity, which curves show the inter-relation between the control of viscosity of the glass delivered to the bath and the positively related controls of longitudinal change of viscosity in the advancing glass and of the tractive effort applied to the advancing glass.

We claim:

1. A method of manufacturing flat glass in ribbon form on a bath of molten metal comprising the steps of delivering molten glass to the bath at a uniform rate to establish a layer of molten glass on the bath, flowing the molten glass forwardly along the bath at an initial speed to develop an advancing ribbon of glass by unhindered lateral flow of the molten glass, setting a temperature gradient along the bath to which the advancing glass is subjected, regulating the speed of discharge from the bath of an ultimate ribbon or float glass of selected reduced width and thickness at a speed higher than said initial forward speed of the molten glass, regulating the setting of said temperature gradient to regulate the rate of increase of viscosity of the glass during its advance thereby to regulate the distribution of tractive force acting longitudinally of the ribbon to increase the speed of the glass and simultaneously reduce the width and thickness dimensions of the ribbon towards said selected width and thickness, and inter-relating the setting of the temperature gradient and said discharge speed to produce said selected reduced width and thickness dimensions in the ribbon at a location along the bath where the glass is advancing along the bath at the speed at which it is eventually discharged from the bath.

2. In a method of manufacturing flat glass from a layer of molten glass established on a bath of molten metal, which layer is advanced in ribbon form along the bath by an applied tractive force and is gradually cooled as it is advanced, and stretched by the applied tractive force, the improvement comprising setting up a temperature gradient existing down the bath to cause gradual and simultaneous reduction in the width and thickness of the glass towards selected reduced width and thickness dimensions of the ultimate ribbon, adjusting the amount of the applied tractive force, inter-relating said adjustment of the applied tractive force to the setting of the temperature gradient to ensure that the selected reduced width and thickness of the ribbon are achieved at a location where the viscosity of the glass arrests any further dimensional change by tractive force acting on the glass at that location, further cooling the ribbon of glass, and discharging the ribbon having said selected reduced dimensions from the bath.

3. A method of manufacturing float glass in ribbon form on a bath of molten metal comprising the steps of delivering molten glass to the bath at a uniform mass-per-minute rate, maintaining the glass in a molten state as it is advanced in ribbon form along the bath, applying traction to the ultimate ribbon of glass, establishing a viscosity gradient along the ribbon of glass which regulates gradual and simultaneous reduction in width and thickness of the glass towards selected reduced width and thickness dimensions of the ultimate ribbon, inter-relating the values of the applied traction and the viscosity gradient to ensure that the selected reduced dimensions of the ribbon are achieved at a location where the viscosity of the glass has increased to a value at which said traction becomes ineffective to produce any further dimensional change in the glass and the glass is still advancing at said uniform mass-per-minute rate, and discharging from the bath the cooled ribbon of glass having said selected reduced width and thickness dimensions.

4. A method of manufacturing float glass in ribbon form on a bath of molten metal comprising the steps of delivering molten glass at a uniform mass-per-minute rate to the bath, advancing the glass along the bath under thermal conditions which ensure that a layer of molten glass is established on the bath, maintaining said glass layer in molten conditions until there is developed on the bath a buoyant body of molten glass by permitting said layer to flow laterally unhindered to the limit of its free flow, applying traction to the glass to advance said buoyant body in ribbon form along the bath, establishing a viscosity gradient along the ribbon of glass which regulates gradual and simultaneous reduction in width and thickness of the glass towards selected reduced width and thickness dimensions of the ultimate ribbon, inter-relating the applied traction relative to that viscosity gradient to ensure said gradual and simultaneous reduction in width and thickness is governed by a width-thickness relationship which determines the dimensions of the ribbon throughout its advance in a deformable state, which said relationship is such that the glass has achieved said selected reduced width and thickness dimensions and is still advancing at said uniform mass-per-minute rate when it has been cooled to a viscosity at which said applied traction becomes ineffective to produce any further dimensional change in the glass, and discharging the ribbon of glass having said selected reduced dimensions from the bath.

References Cited

UNITED STATES PATENTS

| | | | |
|---|---|---|---|
| 3,083,551 | 4/1963 | Pilkington | 65—182 |
| 3,218,141 | 11/1965 | Lambert | 65—65 |
| 3,222,154 | 12/1965 | Pilkington | 65—182 |
| 3,301,651 | 1/1967 | Long | 65—99 |

S. LEON BASHORE, Primary Examiner

E. R. FREEDMAN, Assistant Examiner

U.S. Cl. X.R.

65—65, 162, 163, 182

PO-1050
(5/69)

UNITED STATES PATENT OFFICE
CERTIFICATE OF CORRECTION

Patent No. 3,531,274        Dated September 29, 1970

Inventor(s) George A. Dickinson, Brian W. Oxley and James E. Thomas

It is certified that error appears in the above-identified patent and that said Letters Patent are hereby corrected as shown below:

Column 4, line 58, after "advance" should be inserted --along the bath and to concomitant flattening action--

Column 6, line 61, "46" should read --47--

Column 8, line 6, "or" should read --of--

SIGNED AND SEALED
DEC 8 - 1970

(SEAL)
Attest:

Edward M. Fletcher, Jr.
Attesting Officer

WILLIAM E. SCHUYLER, JR.
Commissioner of Patents